(12) United States Patent
Okaichi et al.

(10) Patent No.: US 9,500,159 B2
(45) Date of Patent: Nov. 22, 2016

(54) ELECTRICITY GENERATION UNIT AND COGENERATION SYSTEM

(71) Applicant: Panasonic Corporation, Kadoma-shi, Osaka (JP)

(72) Inventors: Atsuo Okaichi, Osaka (JP); Osao Kido, Kyoto (JP);
(Continued)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 232 days.

(21) Appl. No.: 14/366,970

(22) PCT Filed: Oct. 18, 2013

(86) PCT No.: PCT/JP2013/006186
§ 371 (c)(1),
(2) Date: Jun. 19, 2014

(87) PCT Pub. No.: WO2014/068887
PCT Pub. Date: May 8, 2014

(65) Prior Publication Data
US 2014/0360187 A1    Dec. 11, 2014

(30) Foreign Application Priority Data
Oct. 29, 2012    (JP) .................................. 2012-238192

(51) Int. Cl.
*F02G 5/02*    (2006.01)
*F01K 3/00*    (2006.01)
(Continued)

(52) U.S. Cl.
CPC . *F02G 5/02* (2013.01); *F01K 3/00* (2013.01); *F01K 3/004* (2013.01); *F01K 9/003* (2013.01);
(Continued)

(58) Field of Classification Search
CPC ............ F02G 5/02; F01K 3/004; F01K 9/003; F01K 3/00; F22B 9/04; F22B 1/028;
(Continued)

(56) References Cited

U.S. PATENT DOCUMENTS 3,563,035 A * 2/1971 Raymond ................ B60K 3/00
122/35
3,974,642 A * 8/1976 Pacault ................... F01K 23/10
126/400
(Continued)

FOREIGN PATENT DOCUMENTS

EP    1 734 303    12/2006
EP    1 830 038    9/2007
(Continued)

OTHER PUBLICATIONS

Extended European Search Report issued in corresponding European Patent Application No. 13852210.7, Sep. 11, 2015, 6 pages.

*Primary Examiner* — Hoang Nguyen
(74) *Attorney, Agent, or Firm* — Hamre, Schumann, Mueller & Larson, P.C.

(57) ABSTRACT

An electricity generation unit 1A includes a combustor 11, a heater 13, and a Rankine cycle circuit 20. The combustor 11 combusts a solid fuel. A combustion gas generated in the combustor 11 passes through a flue 12. The heater 13 contains a heat storage material, and heats the heat storage material by allowing heat exchange to take place between the combustion gas in the flue 12 and the heat storage material. The Rankine cycle circuit 20 has an evaporator 21 that evaporates a working fluid in the Rankine cycle by allowing heat exchange to take place between the heat storage material heated in the heater 13 and the working fluid. With this configuration, stable operation of an electricity generation unit using a combustion gas of a solid fuel is achieved.

10 Claims, 8 Drawing Sheets

(72) Inventors: Takumi Hikichi, Osaka (JP); Masaya Honma, Saitama (JP); Masanobu Wada, Osaka (JP); Osamu Kosuda, Osaka (JP)

(51) Int. Cl.
*F22B 9/04* (2006.01)
*F01K 9/00* (2006.01)
*F22B 1/18* (2006.01)
*F02B 39/08* (2006.01)
*F22B 1/02* (2006.01)

(52) U.S. Cl.
CPC .............. *F02B 39/085* (2013.01); *F22B 1/028* (2013.01); *F22B 1/18* (2013.01); *F22B 9/04* (2013.01); *Y02E 20/14* (2013.01)

(58) Field of Classification Search
CPC ............ F22B 1/18; F02B 39/085; Y02E 20/14
USPC .......................................... 60/651, 671, 659
See application file for complete search history.

(56) References Cited

U.S. PATENT DOCUMENTS

| | | | | |
|---|---|---|---|---|
| 4,094,148 | A | * | 6/1978 | Nelson ...................... F01K 3/00 60/39.182 |
| 4,347,706 | A | * | 9/1982 | Drost ........................ F01K 3/00 290/52 |
| 8,464,535 | B2 | * | 6/2013 | White ....................... F01K 3/08 165/10 |
| 2011/0100009 | A1 | | 5/2011 | Lehar et al. |
| 2011/0314816 | A1 | | 12/2011 | Julian |

FOREIGN PATENT DOCUMENTS

| | | |
|---|---|---|
| JP | 54-079105 | 6/1979 |
| JP | 62-167811 U | 10/1987 |
| JP | 2004-060550 | 2/2004 |
| JP | 2005-201067 | 7/2005 |
| JP | 2007-024023 | 2/2007 |
| JP | 2007-132588 | 5/2007 |
| JP | 2009-185773 | 8/2009 |
| JP | 2012-007600 | 1/2012 |
| WO | 2012/050788 | 4/2012 |

\* cited by examiner

ELECTRICITY GENERATION UNIT AND COGENERATION SYSTEM

TECHNICAL FIELD

The present invention relates to an electricity generation unit that generates electricity using a combustion gas of a solid fuel. The present invention also relates to a cogeneration system including the electricity generation unit.

BACKGROUND ART

Conventionally, boilers using solid fuels are widely known. In particular, boilers using wood pellets as a solid fuel have recently attracted attention from the standpoint of environmental load reduction since wood pellets are a carbon-neutral fuel.

Figure 8:
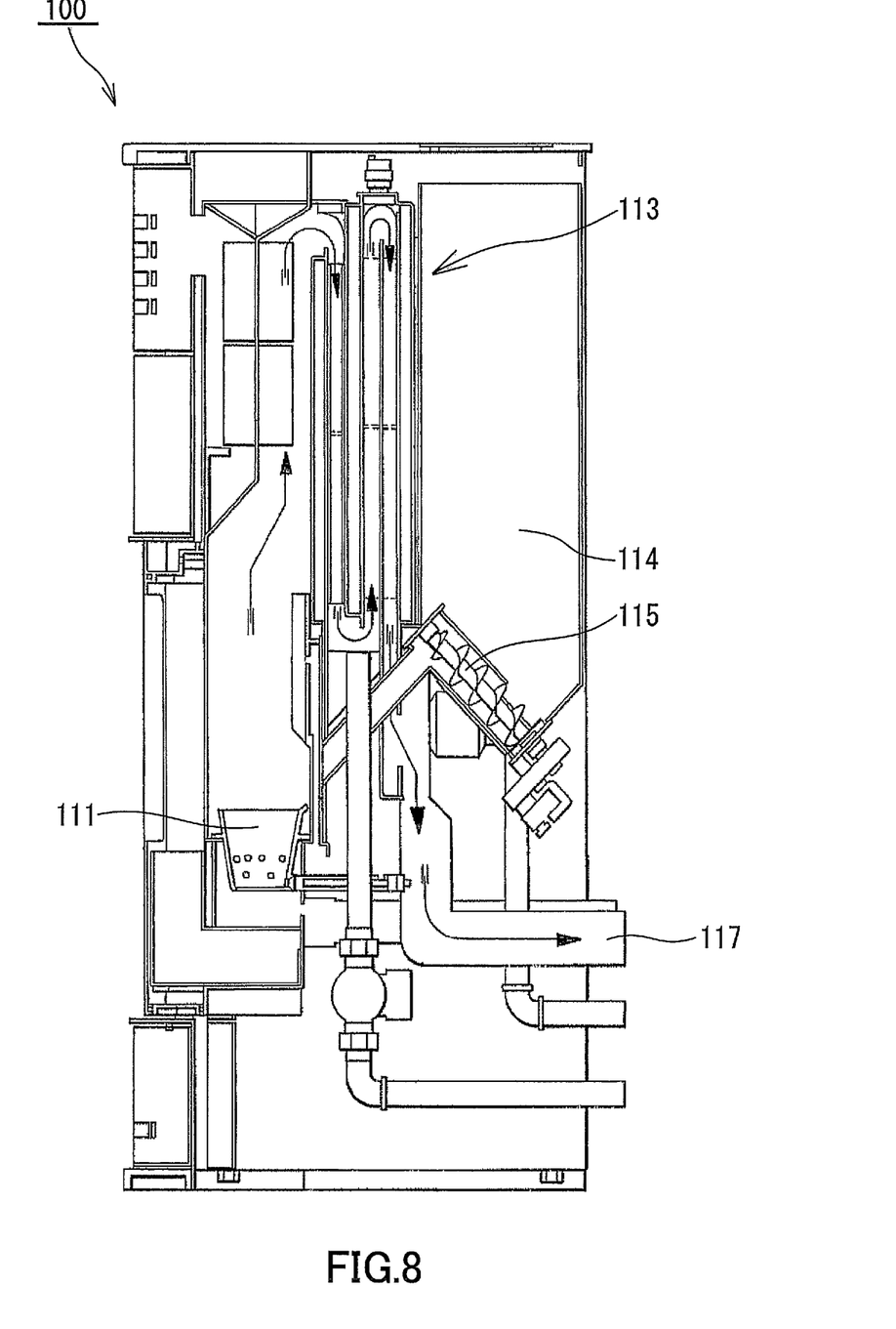
FIG. 8 is a configuration diagram of a conventional pellet boiler.

Patent Literature 1 discloses a pellet boiler 100 shown in FIG. 8. Pellets stored in a hopper 114 are supplied to a hearth 111 by a screw feeder 115. In the hearth 111, the pellets are combusted and a combustion gas is generated. The combustion gas flows through a coiled or labyrinthine path in a heat exchanger 113, and is discharged outside the boiler 100 through a discharge tube 117. The heat exchanger 113 has formed therein a labyrinthine path through which a heat transfer medium used for heating or the like flows. In the heat exchanger 113, the heat transfer medium is heated by the combustion gas.

CITATION LIST

Patent Literature

Patent Literature 1: EP 1734303 A2

SUMMARY OF INVENTION

Technical Problem

In a boiler using a solid fuel, depending on the scale of the boiler, the combustion state of the solid fuel may often be unstable. In this case, there is a possibility that the operation of a Rankine cycle using the combustion gas from the boiler is also unstable.

The present invention aims to achieve stable operation of an electricity generation unit that evaporates a working fluid in a Rankine cycle by using a combustion gas of a solid fuel. The present invention further aims to provide a cogeneration system that uses exhaust heat from the electricity generation unit.

Solution to Problem

The present disclosure provides an electricity generation unit including:
a combustor that combusts a solid fuel;
a flue through which a combustion gas generated in the combustor passes;
a heater that contains a heat storage material and that heats the heat storage material by allowing heat exchange to take place between the combustion gas in the flue and the heat storage material; and
a Rankine cycle circuit having an evaporator that evaporates a working fluid in the Rankine cycle by allowing heat exchange to take place between the heat storage material heated in the heater and the working fluid.

Advantageous Effects of Invention

According to the above electricity generation unit, the working fluid in the Rankine cycle circuit evaporates by exchanging heat with the heat storage material heated by the combustion gas. That is, the interposition of the heat storage material makes it possible that the heat storage material is used in place of the combustion gas as a high-temperature heat source in the Rankine cycle. The same effect as provided by decreasing the temperature change of the combustion gas is obtained by the interposition of the heat storage material. This reduces the temperature fluctuation of the high-temperature heat source for the evaporator. Therefore, the amount of heat exchange in the evaporator is stabilized, and the state of the working fluid having passed through the evaporator can be controlled within certain limits. Consequently, stable operation of the electricity generation unit can be achieved.

DESCRIPTION OF EMBODIMENTS

In the pellet boiler 100 shown in FIG. 8, the heat transfer medium used for heating or the like is heated by direct heat exchange with the combustion gas of the pellets. Unlike a liquid or gaseous fuel, the solid fuel is intermittently supplied to the hearth 111. Therefore, the amount of heat generation in the hearth 111 fluctuates within a certain range.

A discussion will be given of constructing an electricity generation unit that evaporates a working fluid in a Rankine cycle by using a combustion gas from a boiler that uses a solid fuel. In this case, the electricity generation unit increases the pressure of the working fluid liquefied in a condenser for heat exchange with a low-temperature heat source by using a pump, and reduces the pressure of the working fluid gasified in an evaporator for heat exchange with a high-temperature heat source by using a power recovery mechanism such as an expander or a turbine, thereby obtaining power for electricity generation. The temperature of the high-temperature heat source is affected by the amount of heat generation in the combustor. In the case of using a solid fuel, since the temperature of the high-temperature heat source is unstable, the amount of heat exchange in the evaporator fluctuates. Therefore, it may be difficult to control the state of the working fluid having passed through the evaporator within certain limits.

A first aspect of the present disclosure provides an electricity generation unit including:

a combustor that combusts a solid fuel;

a flue through which a combustion gas generated in the combustor passes;

a heater that contains a heat storage material and that heats the heat storage material by allowing heat exchange to take place between the combustion gas in the flue and the heat storage material; and a Rankine cycle circuit having an evaporator that evaporates a working fluid in the Rankine cycle by allowing heat exchange to take place between the heat storage material heated in the heater and the working fluid.

A second aspect of the present disclosure provides the electricity generation unit as set forth in the first aspect, wherein the heater is disposed so as to surround the flue. According to the second aspect, the heat storage material can be efficiently heated by the combustion gas in the flue.

A third aspect of the present disclosure provides the electricity generation unit as set forth in the first or second aspect, wherein the flue penetrates through the heater at a plurality of positions. According to the third aspect, the heat storage material is heated by the combustion gas at the plurality of positions where the flue penetrates through the heater and, therefore, significant temperature non-uniformity in the heat storage material is less likely to occur inside the heater. Consequently, the amount of heat exchange in the evaporator is stabilized, and the state of the working fluid having passed through the evaporator can be controlled within certain limits.

A fourth aspect of the present disclosure provides the electricity generation unit as set forth in any one of the first to third aspects, wherein the working fluid is an organic compound. According to the fourth aspect, the Rankine cycle can easily be constructed even when the temperature of the heat source for the evaporator is relatively low.

A fifth aspect of the present disclosure provides the electricity generation unit as set forth in any one of the first to fourth aspects, wherein the heat storage material is a fluid, and the heat storage material is enclosed in the heater. According to the fifth aspect, the amount of heat exchange in the evaporator is stabilized by virtue of the heat capacity possessed by the fluid serving as the heat storage material, in addition to which the heat-transfer characteristics are improved by heat transfer due to convection.

A sixth aspect of the present disclosure provides the electricity generation unit as set forth in the fifth aspect, wherein the heat storage material is in a liquid state in the heater. According to the sixth aspect, the need for configuring the heater as a high pressure-resistant container is eliminated and, therefore, the heater can be configured in a lightweight form inexpensively. In addition, the heat storage material that is in a liquid state has a large heat capacity and is thus less likely to undergo a temperature change. Therefore, the amount of heat exchange in the evaporator is stabilized, and the state of the working fluid having passed through the evaporator can be controlled within certain limits.

A seventh aspect of the present disclosure provides the electricity generation unit as set forth in the sixth aspect, wherein the evaporator is disposed inside the heater so as to be immersed in the heat storage material that is in a liquid state. According to the seventh aspect, the evaporator is immersed in the heat storage material that is in a liquid state and that has a large heat capacity. Therefore, the amount of heat exchange in the evaporator is stabilized, and the state of the working fluid having passed through the evaporator can be controlled within certain limits.

An eighth aspect of the present disclosure provides the electricity generation unit as set forth in the sixth or seventh aspect, wherein the heat storage material has an evaporation temperature of 100° C. or higher under atmospheric pressure. According to the eighth aspect, the evaporation temperature of the working fluid in the Rankine cycle can be set high and, therefore, an electricity generation unit that exhibits a high electricity generation efficiency can be achieved.

A ninth aspect of the present disclosure provides the electricity generation unit as set forth in any one of the sixth to eighth aspects, wherein the heat storage material has an ignition temperature of 200° C. or higher. According to the ninth aspect, the evaporation temperature of the working fluid in the Rankine cycle can be set high and, therefore, an electricity generation unit that exhibits a high electricity generation efficiency can be achieved.

A tenth aspect of the present disclosure provides the electricity generation unit as set forth in any one of the first to ninth aspects, wherein the heat storage material is an oil. According to the tenth aspect, the evaporation temperature of the working fluid in the Rankine cycle can be set high since oils are generally non-volatile. Therefore, an electricity generation unit that exhibits a high electricity generation efficiency can be achieved.

An eleventh aspect of the present disclosure provides the electricity generation unit as set forth in the tenth aspect, wherein the oil is a silicone oil. According to the eleventh aspect, the evaporation temperature of the working fluid in the Rankine cycle can be set high since silicone oils neither volatilize nor ignite even at 250° C. Therefore, an electricity generation unit that exhibits a high electricity generation efficiency can be achieved.

A twelfth aspect of the present disclosure provides the electricity generation unit as set forth in the first aspect, wherein the heat storage material is in a gas-liquid two-phase state in the heater. According to the twelfth aspect, the heat storage material that is boiling and is in a gas-liquid two-phase state can be used and, therefore, the temperature of the heat storage material is stabilized by the latent heat of evaporation of the heat storage material. That is, the temperature stability of the heat storage material serving as the high-temperature heat source is improved. As a result, the amount of heat exchange in the evaporator is stabilized, and the state of the working fluid having passed through the evaporator can be controlled within certain limits.

A thirteenth aspect of the present disclosure provides the electricity generation unit as set forth in the twelfth aspect, wherein the heat storage material is an organic compound. According to the thirteenth aspect, the boiling point of the heat storage material can be adjusted as appropriate.

A fourteenth aspect of the present disclosure provides a cogeneration system including:

the electricity generation unit as set forth in any one of the first to thirteenth aspects; and a flow path in which a to-be-heated fluid heated by heat exchange with the working fluid flowing in a condenser of the Rankine cycle circuit is supplied outside.

According to the fourteenth aspect, a cogeneration system that uses exhaust heat from an electricity generation unit can be provided.

A fifteenth aspect of the present disclosure provides the cogeneration system as set forth in the fourteenth aspect, wherein the to-be-heated fluid is water or air. According to the fifteenth aspect, the water or air heated can be used for heating, hot-water supply, or the like.

Embodiments of the present invention will be described with reference to the drawings. The following description relates to examples of embodiments of the present invention, and the present invention is not limited to the embodiments given below.

First Embodiment

Figure 1:
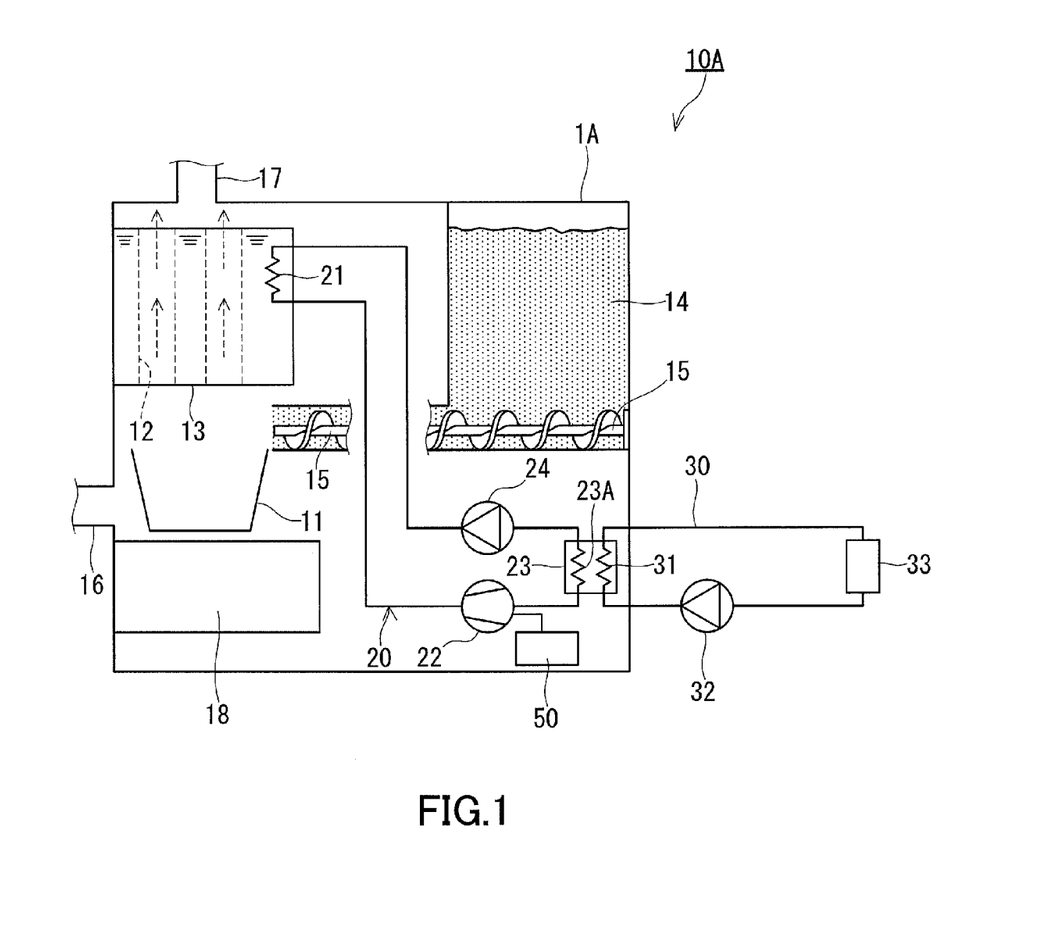
FIG. 1 is a configuration diagram of an electricity generation unit and a cogeneration system according to a first embodiment.

As shown in FIG. 1, a cogeneration system 10A according to a first embodiment includes an electricity generation unit 1A and a flow path 30. The electricity generation unit 1A includes a combustor 11, a flue 12, a heater 13, and a Rankine cycle circuit 20. The combustor 11 is a hearth in which a solid fuel is combusted. A combustion gas generated by combustion of the solid fuel in the combustor 11 passes through the flue 12. The heater 13 contains a heat storage material, and heats the heat storage material by allowing heat exchange to take place between the combustion gas in the flue 12 and the heat storage material. The heat storage material is, for example, a fluid. In the present embodiment, a fluid heat storage material is enclosed in the heater 13. The Rankine cycle circuit 20 has an evaporator 21 that evaporates a working fluid in the Rankine cycle circuit 20 by allowing heat exchange to take place between the heat storage material heated in the heater 13 and the working fluid.

The combustor 11 is made of a refractory material such as a metal, an alloy, or a ceramic. The solid fuel is wood pellets, wood chips, coal, or the like. When the electricity generation unit 1A is to be provided as a small-scale electricity generation unit for use in households or small businesses, the solid fuel is desirably wood pellets or wood chips.

The electricity generation unit 1A further includes: a solid fuel storage portion 14 that stores the solid fuel; and a feeding device 15 that feeds the solid fuel to the combustor 11 from the solid fuel storage portion 14. The solid fuel storage portion 14 is configured, for example, as a container openable and closable by a handle (not shown in the drawings) provided at a part of the housing of the electricity generation unit 1A. This permits the replenishment of the solid fuel storage portion 14 with the solid fuel. The solid fuel storage portion 14 may be configured to be attachable to and detachable from the body of the electricity generation unit 1A. The feeding device 15 is, for example, a screw-type feeding device. The feeding device 15 is disposed so that one end thereof is located in a bottom portion of the solid fuel storage portion 14, and the other end thereof extends to the vicinity of the combustor 11. The feeding device 15 intermittently supplies the solid fuel to the combustor 11 from the solid fuel storage portion 14. In addition, the electricity generation unit 1A includes an air intake path 16 for delivering air from outside to the combustor 11. The air intake path 16 may be provided with a fan for forcibly delivering air to the combustor 11. This permits the solid fuel to continuously combust in the combustor 11.

The combustion gas generated in the combustor 11 goes upward and enters the flue 12 disposed above the combustor 11. The heater 13 is a container (shell) disposed above the combustor 11. The heater 13 is made of, for example, a material having good heat resistance and thermal conductivity such as a metal or an alloy. The heater 13 is disposed so as to surround the flue 12. Thus, the heat storage material is efficiently heated by the combustion gas in the flue 12. As shown in FIG. 1, the flue 12 penetrates through the container serving as the heater 13 at a plurality of positions. This increases an area over which the heat storage material is heated by the combustion gas in the flue 12. In particular, the heat storage material present in the central portion of the heater 13 can be efficiently heated. Therefore, significant temperature non-uniformity in the heat storage material is less likely to occur inside the heater 13. The heater 13 may consist of a single container or may be composed of a plurality of containers coupled together. In the case where the heater 13 is composed of a plurality of containers, the plurality of containers may be arranged in such a manner that the adjacent containers are spaced from each other by a predetermined distance. In this case, the space between the adjacent containers can be used as the flue 12. Also in such a configuration, significant temperature non-uniformity in the heat storage material is less likely to occur inside the heater 13.

The electricity generation unit 1A further includes an exhaust path 17 and an ash receiver 18. The exhaust path 17 has an opening above the flue 12. The combustion gas having passed through the flue 12 enters the exhaust path 17, passes through the exhaust path 17, and is discharged outside the electricity generation unit 1A. Ash generated by combustion of the solid fuel in the combustor 11 is retained in the ash receiver 18.

An ignition device (not shown in the drawings) is provided in the vicinity of the heater 13. At the start-up of the electricity generation unit 1A, first, a predetermined amount of the solid fuel is supplied to the combustor 11 by the feeding device 15. Subsequently, the solid fuel supplied to the combustor 11 is ignited by the ignition device, and the solid fuel thus begins to combust. At the start-up of the electricity generation unit 1A, the amount of the solid fuel fed by the feeding device 15 is set to a high level in order to increase the temperature of the heat storage material up to a target temperature in a short time. In accordance with this, the flow rate of air in the air intake path 16 is also set to a high level. When the temperature of the heat storage material reaches the target temperature, steady operation for stabilizing the temperature of the heat storage material at the target temperature is performed, and the amount of the solid fuel fed by the feeding device 15 is adjusted so that the amount of heat generation (the amount of combustion gas generated) in the combustor 11 falls within a predetermined range.

The Rankine cycle circuit 20 includes the evaporator 21, an expander 22, a condenser 23, and a pump 24, and is configured by connecting these elements by pipes in the order in which they are mentioned. The evaporator 21 is formed, for example, as a flow path formed in a coiled shape extending from the inlet to the outlet of the evaporator 21 or as a flow path meandering from the inlet to the outlet of the evaporator 21. The working fluid flowing in the evaporator 21 evaporates by exchanging heat with the heat storage material enclosed in the heater 13, and thus becomes superheated vapor.

The type of the working fluid is not particularly limited. The working fluid is water, a hydrocarbon, a halocarbon, an alcohol, a ketone, or the like. Examples of the hydrocarbon include alkanes such as methane, butane, pentane, and isopentane. Examples of the halocarbon include R-245fa, R-134a, etc. Examples of the alcohol include ethanol etc. Examples of the ketone include acetone etc. In the present embodiment, the heat source for the evaporator 21 is not the combustion gas itself but the heat storage material contained in the heater 13. Accordingly, there is a possibility that the temperature of the heat source for the evaporator 21 is lower than the temperature of the combustion gas. It is therefore desirable that the working fluid be, for example, an organic compound including at least one selected from the group consisting of a hydrocarbon, a halocarbon, an alcohol, and a ketone. It is desirable that the normal boiling point of the organic compound be lower than the normal boiling point of water. If so, the Rankine cycle can easily be constructed in the present embodiment even when the temperature of the heat source for the evaporator 21 is relatively low. The working fluid being an organic compound allows for a relatively low temperature of the working fluid in the evaporator of the Rankine cycle, and is therefore desirable also from the standpoint of pressure-resistant design of the Rankine cycle.

For example, the heat storage material is in a liquid state in the heater 13. The evaporator 21 is disposed inside the heater 13 so as to be immersed in the heat storage material that is in a liquid state. Since the solid fuel is intermittently supplied to the combustor 11, the amount of heat generation (the amount of the combustion gas generated) in the combustor fluctuates within a certain range. Therefore, the degree of heating of the heat storage material by the combustion gas may fluctuate. When the heat storage material is in a liquid state in the heater 13, the heat storage material exhibits a relatively large heat capacity due to having a somewhat large mass. Therefore, even when the degree of heating of the heat storage material by the combustion gas in the flue 12 fluctuates due to the fluctuation in the amount of heat generation in the combustor 11, the temperature of the heat storage material is not readily changed. That is, the same effect as provided by decreasing the temperature change of the combustion gas is obtained by the interposition of the heat storage material, and the temperature fluctuation of the high-temperature heat source for the evaporator 21 is thus reduced. This reduces the fluctuation in the amount of heat exchange in the evaporator 21. Consequently, the state of the working fluid having passed through the evaporator 21 can be controlled within certain limits. The evaporation of the working fluid in the evaporator 21 can be stabilized. In addition, when the heat storage material is in a liquid state in the heater 13, the container constituting the heater 13 need not be a high pressure-resistant container. Therefore, the heater 13 can be configured in a lightweight form inexpensively.

A part of the evaporator 21 may be immersed in the heat storage material that is in a liquid state, and a part of the evaporator 21 may be heated directly by the combustion gas. Desirably, the entire evaporator 21 is immersed in the heat storage material that is in a liquid state, and the evaporator 21 is heated only by the heat storage material.

The evaporation temperature of the heat storage material under atmospheric pressure is, for example, in the range of 100° C. to 300° C. Therefore, the evaporation temperature of the working fluid in the Rankine cycle circuit 20 can be set high. Consequently, the electricity generation unit 1A can exhibit a high electricity generation efficiency. In addition, the ignition temperature of the heat storage material is, for example, in the range of 200° C. to 500° C. Therefore, the evaporation temperature of the working fluid in the Rankine cycle circuit 20 can be set high. Consequently, the electricity generation unit 1A can exhibit a high electricity generation efficiency. Specifically, the heat storage material may be an oil. Oils are generally less prone to volatilization and, therefore, can be suitably used as the heat storage material. As the oil, a mineral oil, a synthetic oil, a vegetable oil, or the like, can be used. In particular, a silicone oil can be suitably used as the heat storage material since silicone oils neither volatilize nor ignite even at 250° C.

The expander 22 expands the working fluid evaporated in the evaporator 21. A positive-displacement fluid machine of the scroll type, the rotary type, the reciprocating type, or the screw type, can be used as the expander 22. When it is intended to provide the electricity generation unit 1A as a small-scale electricity generation unit aimed at households, small businesses etc., the expander 22 is desirably a fluid machine of the scroll type or the rotary type. The expander 22 is coupled to an electricity generator 50. The expander 22 expands the working fluid, so that the electricity generator 50 is driven. Thus, electricity generation is performed.

The condenser 23 condenses the working fluid having been expanded in the expander 22 and having passed through the expander 22. The condenser 23 is a spiral heat exchanger, a plate heat exchanger, a double-pipe heat exchanger, or the like. The condenser 23 includes a to-be-cooled portion 23A through which the working fluid flows and a cooling portion 31 through which a to-be-heated fluid that cools the working fluid flows. The cooling portion 31 constitutes a part of the flow path 30 in which the to-be-heated fluid heated by heat exchange with the working fluid flowing in the condenser 23 is supplied outside.

The pump 24 pressurizes the working fluid condensed in the condenser 23 and supplies the working fluid to the evaporator 21. The pump 24 is, for example, a common type of positive-displacement pump.

The to-be-heated fluid having been heated in the cooling portion 31 is used for the purpose of heating, hot-water supply, or the like. In FIG. 1, the flow path 30 is a heating circuit by which the to-be-heated fluid having been heated is used for heating. A pump 32, the cooling portion 31, and a heat radiator 33 are connected in this order by pipes to form the flow path 30. Thus, the to-be-heated fluid circulates in the flow path 30. The to-be-heated fluid having a low temperature is supplied to the cooling portion 31 by the pump 32, and cools the working fluid. The to-be-heated fluid having passed through the cooling portion 31 and having a high temperature releases its own heat in the heat radiator to the outside. In this manner, for example, room heating is performed. The to-be-heated fluid having released heat and having a low temperature is supplied again to the cooling portion 31 by the pump 32. The cogeneration system 10A including the electricity generation unit 1A and the flow path 30 is configured in the manner described above. Therefore, exhaust heat from the electricity generation unit 1A can be effectively used. In the present embodiment, the to-be-heated fluid is, for example, water. The to-be-heated fluid may contain an antifreeze solution for prevention of freezing.

The flow path 30 is not limited to a flow path in which the to-be-heated fluid circulates. The form of the flow path 30 is not particularly limited as long as the flow path 30 is configured so that the to-be-heated fluid heated by heat exchange with the working fluid flowing in the condenser 23 is supplied outside.

The operations of the electricity generation unit 1A and the cogeneration system 10A will be described. Immediately after the start-up of the electricity generation unit 1A, the evaporator 21 cannot evaporate the working fluid 21 sufficiently since the heat storage material has a low temperature. Therefore, immediately after the start-up of the electricity generation unit 1A, the circulation of the working fluid in the Rankine cycle circuit 20 is allowed to remain stopped, or the amount of the working fluid circulating in the Rankine cycle circuit 20 is set small. The Rankine cycle circuit 20 is operated in such a manner that the amount of the working fluid circulating in the Rankine cycle circuit 20 increases with the increase in the temperature of the heat storage material. When the temperature of the heat storage material reaches a target temperature, the Rankine cycle circuit 20 is operated in such a manner that the amount of the working fluid circulating in the Rankine cycle circuit 20 is kept approximately constant. Thus, the electricity generation unit 1A is stably operated.

Modifications

Figure 2:
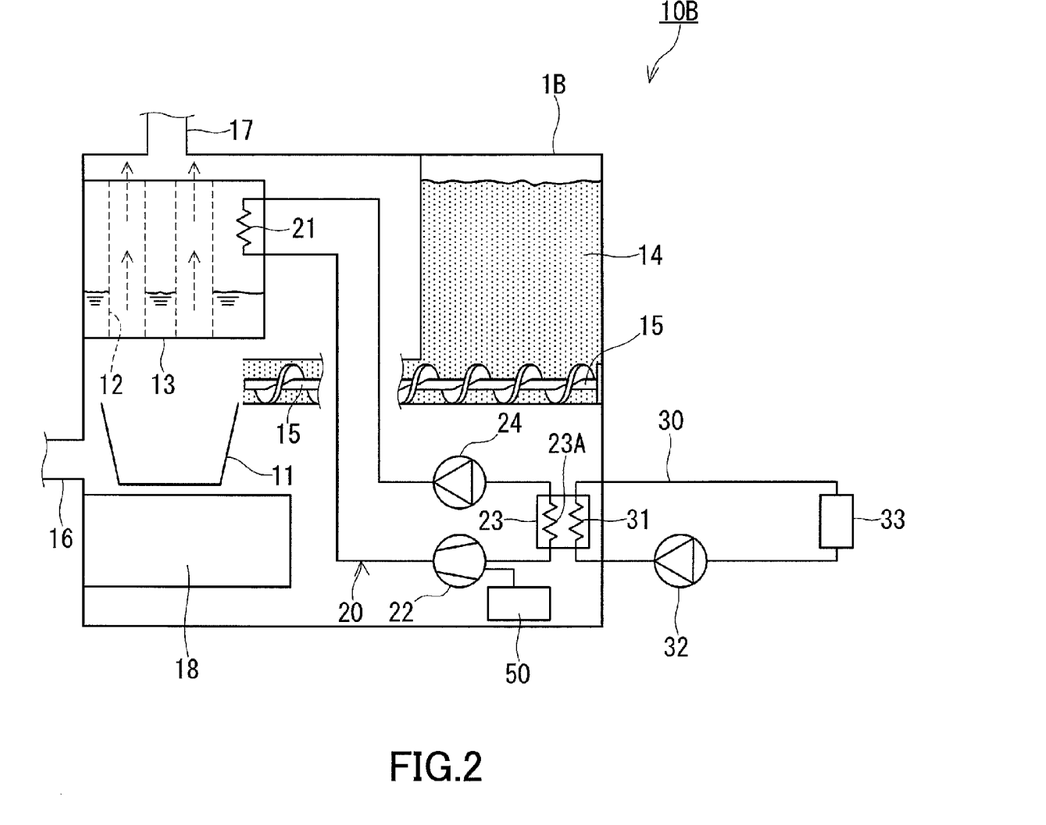
FIG. 2 is a configuration diagram of an electricity generation unit and a cogeneration system according to a modification of the first embodiment.

The electricity generation unit 1A and the cogeneration system 10A according to the first embodiment can be modified as shown in FIG. 2. An electricity generation unit 1B and a cogeneration system 10B according to this modification are configured in the same manner as in the first embodiment, except for the matters particularly described below. In the present modification, the same components as those of the first embodiment are denoted by the same reference characters, and a detailed description thereof is omitted.

In the electricity generation unit 1B, the heat storage material is in a gas-liquid two-phase state in the heater 13. That is, the heat storage material is a volatile fluid. The evaporator 21 is disposed inside the heater 13 so as to be located in the gas phase of the heat storage material. The heat storage material that is in a gas state exchanges heat with the working fluid and is thus condensed into a liquid state. This prevents the inside of the heater 13 from having an excessively high pressure. By virtue of the fact that the heat storage material is in a gas-liquid two-phase state in the heater 13, the temperature of the heat storage material in the heater 13 is stabilized. Consequently, the amount of heat exchange in the evaporator 21 is stabilized, and the state of the working fluid having passed through the evaporator 21 can be controlled within certain limits.

The heat storage material that is in a gas-liquid two-phase state in the heater 13 is, for example, an organic compound. When the heat storage material is an organic compound, the boiling point of the heat storage material can be adjusted as appropriate by selection of the organic compound used as the heat storage material. When a mixture of a plurality of organic compounds is used as the heat storage material, the boiling point of the heat storage material can be adjusted as appropriate depending on the composition of the mixture. The organic compound serving as the heat storage material includes, for example, at least one selected from the group consisting of an alcohol, a ketone, and water (pressurized water). It is desirable that the normal boiling point of the organic compound serving as the heat storage material be 100° C. to 200° C. If so, relatively low standards can be employed for the pressure resistance of the heater 13 and, therefore, the production cost of the heater 13 can be reduced. Furthermore, it is desirable that the organic compound serving as the heat storage material be water or an alcohol. This is desirable from the standpoint of safety when the heat storage material is discharged outside the heater 13 in order to prevent the internal pressure of the heater 13 from excessively increasing.

Figure 3:
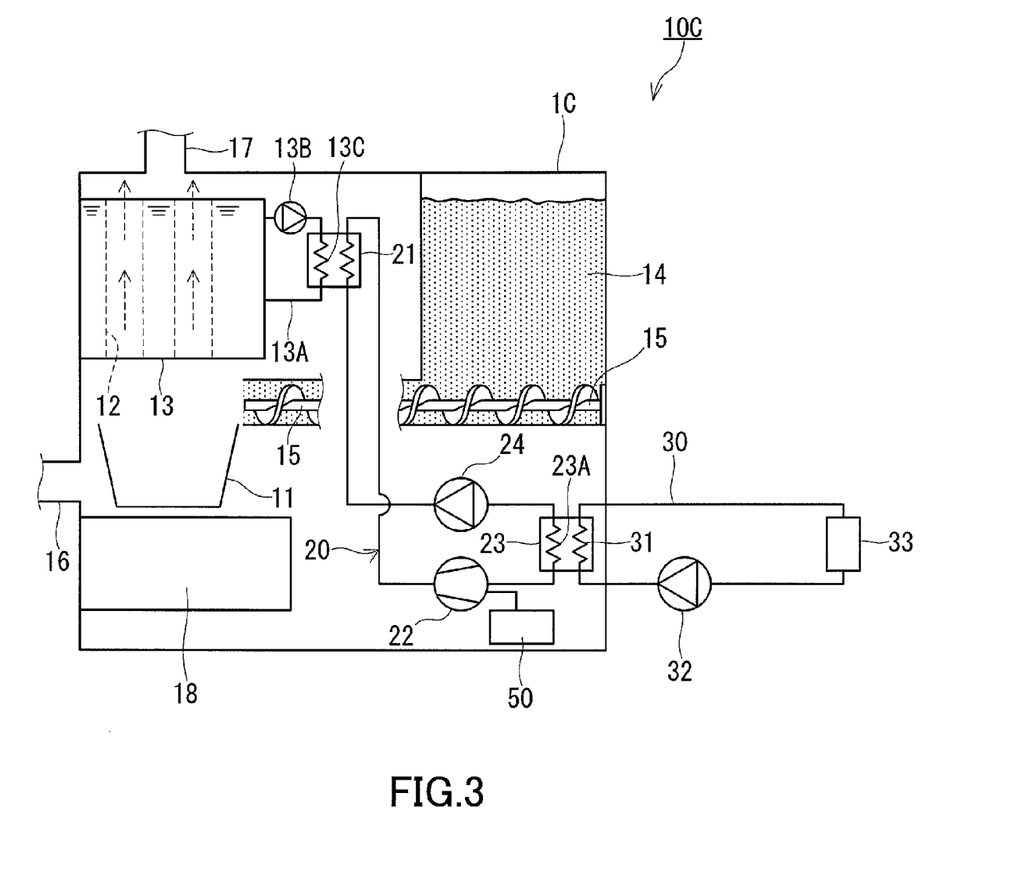
FIG. 3 is a configuration diagram of an electricity generation unit and a cogeneration system according to another modification of the first embodiment.

The electricity generation unit 1A and the cogeneration system 10A according to the first embodiment can be modified as shown in FIG. 3. An electricity generation unit 1C and a cogeneration system 10C according to this modification are configured in the same manner as in the first embodiment, except for the matters particularly described below. The same components as those of the first embodiment are denoted by the same reference characters, and a detailed description thereof is omitted.

The heater 13 of the electricity generation unit 1C includes a circulation circuit 13A in which the heat storage material extracted from the body of the heater 13 is circulated so as to return the heat storage material to the body of the heater 13. The circulation circuit 13A includes a pump 13B and a heat exchange portion 13C.

The body of the heater 13, the pump 13B, and the heat exchange portion 13C are connected by pipes to form the circulation circuit 13A. The heat exchange portion 13C constitutes a part of the evaporator 21. The heat storage material supplied to the heat exchange portion 13C from the inside of the body of the heater 13 by the pump 13B exchanges heat with the working fluid flowing in the evaporator 21. Thus, the evaporator 21 evaporates the working fluid. The heat storage material having passed through the heat exchange portion 13C and having a low temperature returns to the body of the heater 13, and is heated again by the combustion gas in the flue 12. The evaporator 21 is, for example, a plate heat exchanger.

In the electricity generation unit 1C, a part of the circulation circuit 13A constitutes the evaporator 21. The heat storage material in the circulation circuit 13A is not heated directly by the combustion gas. Therefore, the influence of the fluctuation in the amount of heat generation in the combustor 11 is less than when the evaporator 21 is provided inside the heater 13. Consequently, the amount of heat exchange in the evaporator 21 is stabilized, and the state of the working fluid having passed through the evaporator 21 can be controlled within certain limits.

Figure 4:
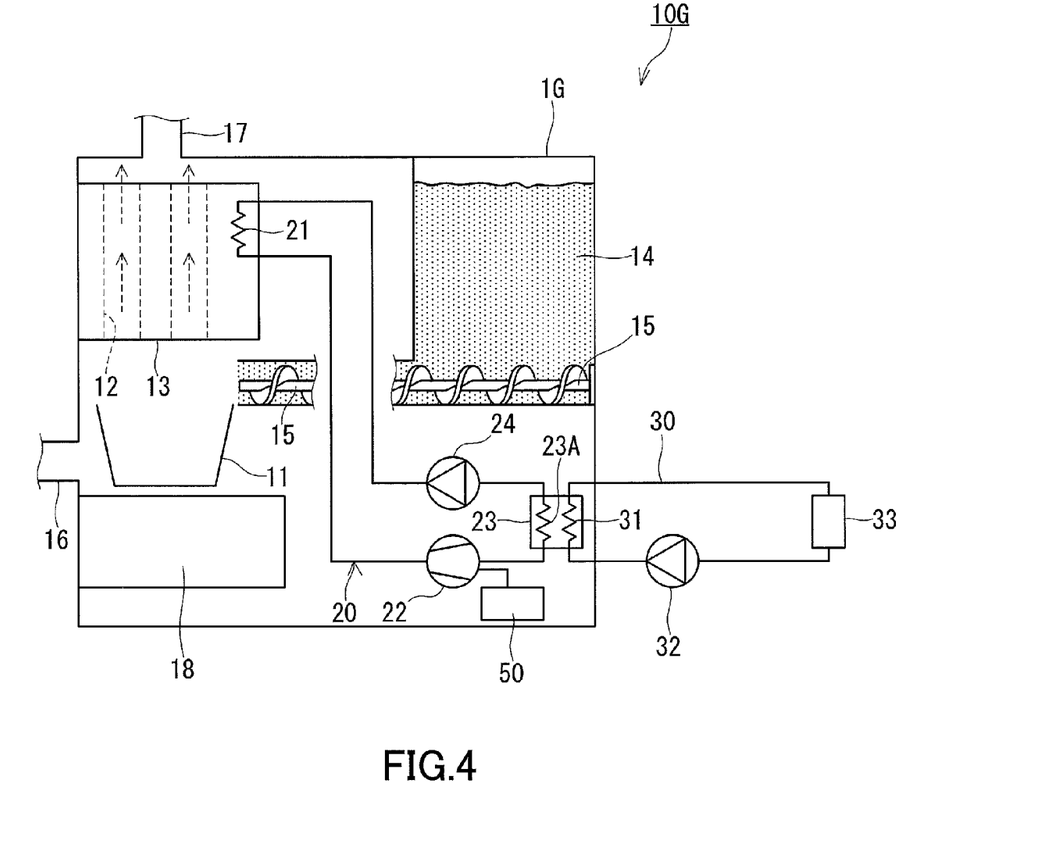
FIG. 4 is a configuration diagram of an electricity generation unit and a cogeneration system according to still another modification of the first embodiment.

The electricity generation unit 1A and the cogeneration system 10A according to the first embodiment can be modified as shown in FIG. 4. An electricity generation unit 1G and a cogeneration system 10G according to this modification are configured in the same manner as in the first embodiment, except for the matters particularly described below. The same components as those of the first embodiment are denoted by the same reference characters, and a detailed description thereof is omitted.

The electricity generation unit 1G is different from the electricity generation unit 1A in that the heater 13 contains a solid heat storage material. For example, a metal, an alloy, or a ceramic can be used as the solid heat storage material. The heater 13 is not a container for enclosing the solid heat storage material, but the whole of the heater 13 is formed as a block of the solid heat storage material. In this case, the flue 12 is formed so as to penetrate through the block of the heat storage material. In addition, the evaporator 21 is embedded in the block of the solid heat storage material. The heater 13 may be a hollow container and, for example, a granular or powdery solid heat storage material may be enclosed in the heater 13.

Second Embodiment

Figure 5:
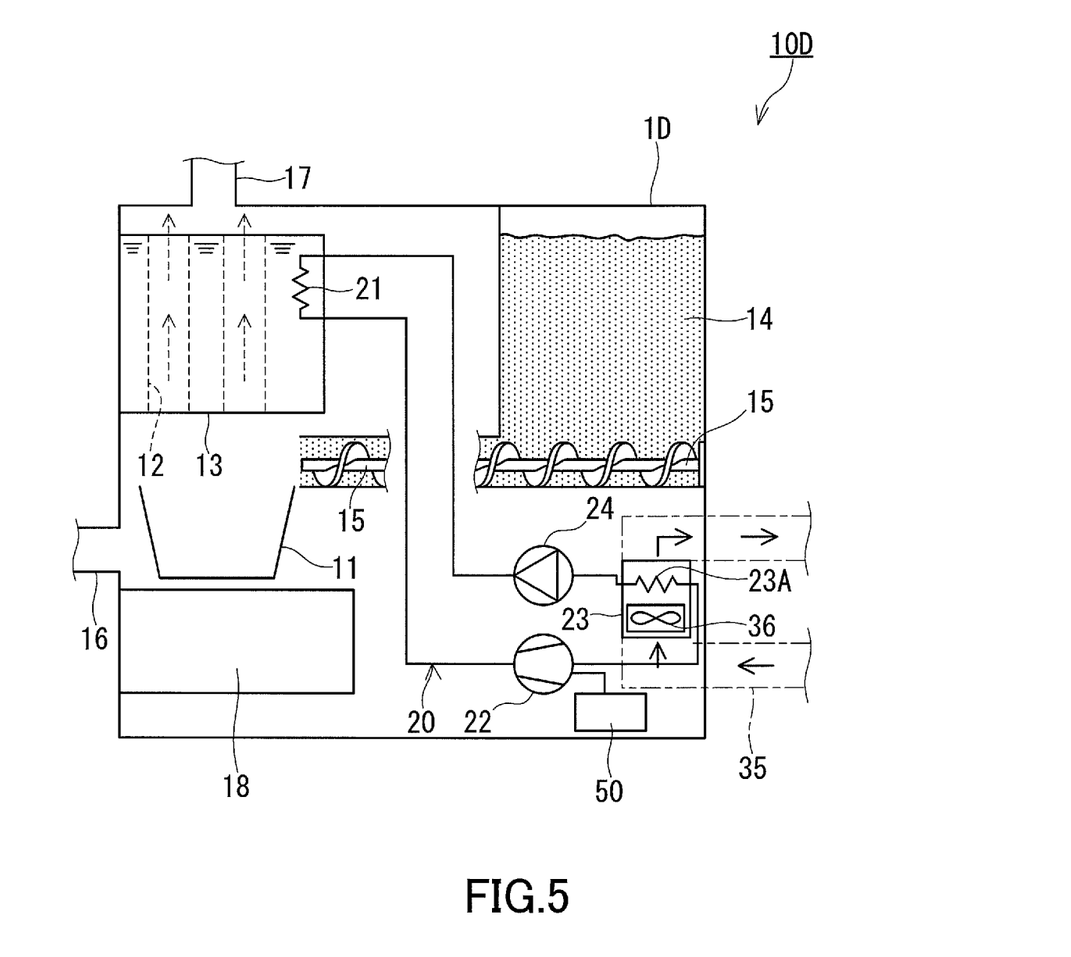
FIG. 5 is a configuration diagram of an electricity generation unit and a cogeneration system according to a second embodiment.

Next, an electricity generation unit 1D and a cogeneration system 10D according to a second embodiment will be described. The electricity generation unit 1D is configured in the same manner as the electricity generation unit 1A of the first embodiment, except for the matters particularly described below.

The condenser 23 of the electricity generation unit 1D is an air-cooled heat exchanger and is, for example, a fin tube heat exchanger. As shown in FIG. 5, the condenser 23 of the electricity generation unit 1D includes: a to-be-cooled portion 23A through which the working fluid flows; and a fan 36 for forcibly delivering air to the to-be-cooled portion 23A. The working fluid flowing in the to-be-cooled portion 23A is cooled by air and thus condensed. The to-be-cooled portion 23A and the fan 36 are disposed inside a flow path 35 that is an air duct. Air in the flow path 35 is heated when passing through the condenser 23. The heated air is supplied outside through the flow path 35. For example, the downstream end of the flow path 35 opens into a room. Thus, the heated air is supplied to the room, and room heating is performed. That is, in the cogeneration system 10D, the to-be-heated fluid is air. In the above manner, exhaust heat from the electricity generation unit 1D can be effectively used.

Third Embodiment

Figure 6:
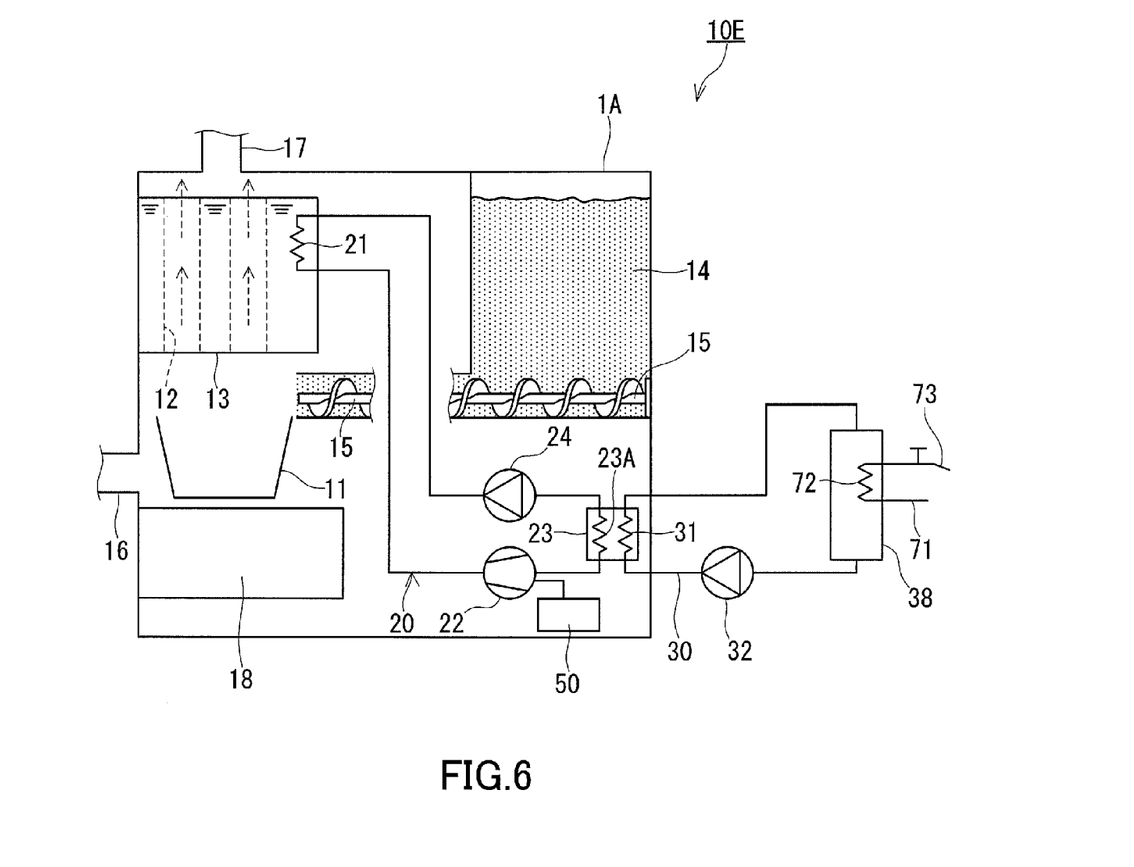
FIG. 6 is a configuration diagram of an electricity generation unit and a cogeneration system according to a third embodiment.

Next, a cogeneration system 10E according to a third embodiment will be described. The electricity generation unit 1A of the cogeneration system 10E is configured in the same manner as in the first embodiment and, therefore, a detailed description thereof is omitted.

The cogeneration system 10E is designed to use exhaust heat from the electricity generation unit 1A for hot-water supply. As shown in FIG. 6, the cogeneration system 10E includes the flow path 30 in which a to-be-heated fluid circulates. The to-be-heated fluid is, for example, water. The pump 32, the cooling portion 31 constituting a part of the condenser 23, and a hot-water storage tank 38 are connected by pipes to form the flow path 30. Low-temperature water is supplied to the cooling portion 31 by the pump 32. The water flowing in the cooling portion 31 exchanges heat with the working fluid flowing in the to-be-cooled portion 23A. Thus, the low-temperature water is heated and hot water is produced. The hot water having passed through the cooling portion 31 is supplied to the hot-water storage tank 38. A heat exchanger 72 is disposed inside the hot-water storage tank 38. A water supply pipe 71 and a hot-water discharge pipe 73 are connected to the heat exchanger 72. Low-temperature water is supplied to the heat exchanger 72 through the water supply pipe 71, and exchanges heat with hot water in the hot-water storage tank 38. The hot water thus produced is supplied outside through the hot-water discharge pipe 73. That is, the hot water produced in the condenser 23 can be used as a heat source for hot-water supply. Low-temperature water is reserved in a bottom portion of the hot-water storage tank 39, and this water is supplied again to the cooling portion 31 by the pump 32.

Figure 7:
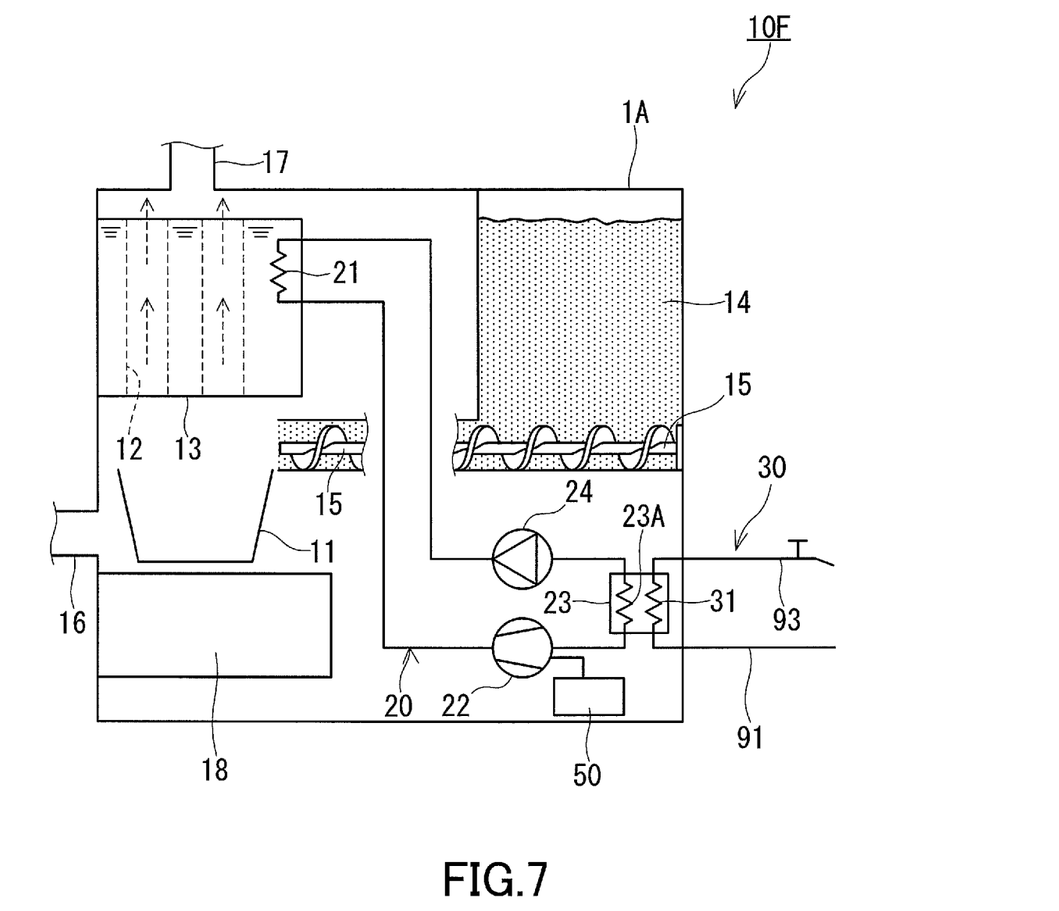
FIG. 7 is a configuration diagram of an electricity generation unit and a cogeneration system according to a modification of the third embodiment.

The cogeneration system 10E according to the third embodiment can be modified into a cogeneration system 10F as shown in FIG. 7. The cogeneration system 10F is configured in the same manner as the cogeneration system 10E, except for the matters particularly described below.

In the cogeneration system 10F, a water supply pipe 91 and a hot-water discharge pipe 93 are connected to the cooling portion 31 to form a flow path 39 for the to-be-heated fluid. In the condenser 23, the to-be-heated fluid flowing in the cooling portion 31 and the working fluid flowing in the to-be-cooled portion 23A exchange heat. The to-be-heated fluid is water. Low-temperature water supplied through the water supply pipe 91 exchanges heat with the working fluid flowing in the to-be-cooled portion 23A, and is thus heated to become hot water. This hot water is supplied outside through the hot-water discharge pipe 93.

INDUSTRIAL APPLICABILITY

The present invention is useful for an electricity generation unit that evaporates a working fluid in a Rankine cycle circuit by using a combustion gas of a solid fuel such as wood pellets, wood chips, or coal, and is also useful for a cogeneration system including the electricity generation unit.

The invention claimed is:

1. An electricity generation unit comprising:
   a combustor that combusts a solid fuel;
   a flue through which a combustion gas generated in the combustor passes;
   a heater that contains a heat storage material and that heats the heat storage material by allowing heat exchange to take place between the combustion gas in the flue and the heat storage material; and
   a Rankine cycle circuit having an evaporator that evaporates a working fluid in the Rankine cycle by allowing heat exchange to take place between the heat storage material heated in the heater and the working fluid, wherein
   the heat storage material is enclosed in a liquid state in the heater, and the evaporator is disposed inside the heater so as to be immersed in the heat storage material in the liquid state.

2. The electricity generation unit according to claim 1, wherein the heater is disposed so as to surround the flue.

3. The electricity generation unit according to claim 1, wherein the flue penetrates through the heater at a plurality of positions.

4. The electricity generation unit according to claim 1, wherein the working fluid is an organic compound.

5. The electricity generation unit according to claim 1, wherein the heat storage material has an evaporation temperature of 100° C. or higher under atmospheric pressure.

6. The electricity generation unit according to claim 1, wherein the heat storage material has an ignition temperature of 200° C. or higher.

7. The electricity generation unit according to claim 1, wherein the heat storage material is an oil.

8. The electricity generation unit according to claim 7, wherein the oil is an silicone oil.

9. A cogeneration system comprising:
   the electricity generation unit according to claim 1; and
   a flow path in which a to-be-heated fluid heated by heat exchange with the working fluid flowing in a condenser of the Rankine cycle circuit is supplied outside.

10. The cogeneration system according to claim 9, wherein the to-be-heated fluid is water or air.

* * * * *